(12) United States Patent
Dabbousi et al.

(10) Patent No.: US 6,884,531 B2
(45) Date of Patent: Apr. 26, 2005

(54) LIQUID HYDROCARBON BASED FUELS FOR FUEL CELL ON-BOARD REFORMERS

(75) Inventors: Bashir Osama Dabbousi, Dhahran (SA); Anwar Hasan Al-Khawajah, Dammam (SA); Gary Dean Martinie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 10/152,236

(22) Filed: May 20, 2002

(65) Prior Publication Data

US 2003/0003331 A1 Jan. 2, 2003

Related U.S. Application Data

(60) Provisional application No. 60/292,595, filed on May 21, 2001.

(51) Int. Cl.$^7$ ............................. H01M 8/06; C01L 1/16
(52) U.S. Cl. ............................. 429/17; 585/13; 585/14
(58) Field of Search ............................. 429/17, 19, 20; 585/7, 13, 14; 208/15

(56) References Cited

U.S. PATENT DOCUMENTS

| | | | |
|---|---|---|---|
| 3,453,147 A | 7/1969 | Griffin, Jr. | 136/86 |
| 3,592,758 A | 7/1971 | Inwood | 208/89 |
| 3,654,139 A | 4/1972 | Winsor et al. | 208/89 |
| 3,691,060 A | 9/1972 | Inwood | 208/89 |
| 3,714,030 A | 1/1973 | WInsor et al. | 208/210 |
| 3,877,887 A * | 4/1975 | Moore et al. | 585/14 X |
| 4,469,590 A | 9/1984 | Schucker et al. | 208/143 |
| 5,284,717 A | 2/1994 | Yamase et al. | 208/119 |
| 5,565,072 A | 10/1996 | Faita et al. | 204/256 |
| 5,686,196 A | 11/1997 | Singh et al. | 429/17 |
| 6,022,634 A | 2/2000 | Ramunni et al. | 429/34 |
| H1849 H | 5/2000 | Fourie et al. | 429/17 |
| 6,083,425 A | 7/2000 | Clawson et al. | 252/372 |
| 6,126,908 A | 10/2000 | Clawson et al. | 422/190 |
| 6,180,842 B1 * | 1/2001 | Berlowitz et al. | 585/14 X |
| 6,187,465 B1 * | 2/2001 | Galloway | 429/17 |
| 6,207,122 B1 | 3/2001 | Clawson et al. | 423/418.2 |
| 6,254,839 B1 | 7/2001 | Clawson et al. | 422/190 |
| 2003/0023120 A1 * | 1/2003 | Matsumoto et al. | 585/14 |
| 2003/0105370 A1 * | 6/2003 | Saitou et al. | 585/14 |
| 2003/0162060 A1 * | 8/2003 | Butler et al. | 429/17 |

* cited by examiner

*Primary Examiner*—Stephen J. Kalafut
(74) *Attorney, Agent, or Firm*—Abelman, Frayne & Schwab

(57) ABSTRACT

Naphtha-based fuels which have less than 1 ppm of sulfur and in excess of 15%, by weight, of hydrogen and an aromatics content of less than 1%, by weight, have been found to be useful as a fuel source for vehicular fuel cells.

10 Claims, 6 Drawing Sheets

Bed Exit Methane Mole Fraction

Figure 2. Bed Exit Temperatures

Figure 3. Bed Exit Methane Mole Fraction

Figure 4. Experimental Syngas Efficiency

Figure 6. Syngas Production Efficiency for Fuels Tested (100 % Methane Conversion)

LIQUID HYDROCARBON BASED FUELS FOR FUEL CELL ON-BOARD REFORMERS

RELATED U.S. APPLICATION DATA

This Application is a Non-Provisional Application based upon Provisional Application U.S. Ser. No. 60/292,595 which was filed on May 21, 2001, the disclosure of which is incorporated herein by reference and upon which a claim to priority is based.

TECHNICAL FIELD

The present invention relates to a hydrocarbon fuel for use in fuel cells and, in particular, to a naphtha-based fuel for use in a vehicular fuel cell with an on-board reformer.

BACKGROUND OF THE INVENTION

Growing environmental demands and the need for higher efficiency vehicles—dictated to a great extent by concerns relating to global warming—has triggered great interest in fuel cells as propulsion systems for transportation vehicles. This has prompted an extensive search for new methods of delivering hydrogen fuel to these cells. One of the most likely options for delivering hydrogen fuel is to provide on-board reforming of liquid hydrocarbon fuels coupled with hydrogen separation.

Gasoline has evolved over many decades to satisfy the requirements of the internal combustion engine. As the prospect of vehicles employing fuel cells moves closer to being a reality, petroleum companies must consider how fuel specifications will change. For example, "octane" as used for gasoline is a useless performance index for a fuel cell power platform and, in fact, typical octane enhancers actually complicate the process.

Several fuels have been suggested as possible candidates for fuelling fuel cell vehicles. These include methanol, F-T naphtha and diesel, and hydrogen. With the development of fuel reformers capable of converting liquid hydrocarbon fuels into hydrogen, the likelihood of using a purely hydrocarbon fuel becomes more feasible. While several fuels have been suggested, and a few have been tested, the concept of optimizing and designing a naphtha-based fuel is both intriguing and reasonable, since it has a low degree of volatility, a high hydrogen content, ready availability and low cost.

This option also provides a safe fuel which is compatible with existing service stations, supply, distribution, and storage infrastructure, as well as the most economic system of fueling. Low-volatility liquid hydrocarbon fuels may be stored in existing vehicular and service station tanks, pumped with existing equipment, and transported through existing pipelines and by truck, marine and rail tankers.

A method for producing raw materials for a reformer by cracking and desulfurizing petroleum fuels is disclosed in U.S. Pat. No. 5,284,717 to Yamasee and which is incorporated herein by reference. This patent discloses an integrated system for stationary fuel cell electric power generation from diesel or naphtha. The fuel treatment process relies on a single stage zeolite or silicate-supported catalyst typically of the cobalt, molybdenum, nickel, iron, tungsten, chromium or gallium type. In the disclosed process, the feedstocks are cracked, or reduced in molecular weight, the aromatic content is increased, and a large proportion of the liquid fuel is converted to gas. The combined fuel crackate is treated in an adsorber to remove hydrogen sulfide, then fed directly to a steam reformer to produce a syn-gas mixture. However, there is no disclosure of hydrogenating aromatics, or producing a naphtha range liquid, which is isolated, stored, then provided for fueling ground-based transportation vehicles. Also, there is no suggestion of providing a process which reduces aromatics, increases hydrogen content, and which results in a low RVP liquid fuel which is sulfur-free and suitable for automobiles.

It is, accordingly, an object of the present invention to provide a naphtha-based fuel for use in a fuel cell and/or a fuel cell reformer.

It is another object of the present invention to provide a naphtha-based fuel which has an extremely low sulfur content, as well as a high hydrogen content and a low aromatics content to provide an efficient and compatible fuel for a fuel cell and/or fuel cell reformer.

It is a further object of the present invention to provide a process for producing a naphtha-based fuel which is efficient and compatible with a fuel cell and fuel cell reformer, which fuel has an extremely low sulfur content, a high hydrogen content and a low aromatics content.

SUMMARY OF THE INVENTION

An embodiment of the present invention is directed to the design and optimization of liquid hydrocarbon-based fuels, such as naphtha, for use in a fuel cell having an on-board reformer, such as might be used in powering a vehicle, e.g., a car, truck, bus, etc. The method used for the production of the optimized fuels of the present invention relies on commercially available petroleum processes, such as hydrotreating and de-aromatization, i.e., hydrogenation.

It has been found that the combination of hydrotreating light and heavy straight run naphtha, combined with dearomatization, results in an ultra-low sulfur content naphtha fuel that has a high paraffins and hydrogen content, and a very low aromatics content. The processes normally used to produce industrial paraffin solvents are employed in this embodiment to produce a low-cost, high quality, clean fuel for fueling vehicles that employ fuel cells and which utilize on-board reforming of liquid hydrocarbon based fuels.

The fuel cells which can be employed to advantage in the present invention include the following types: solid oxide, proton exchange membrane (PEM), molten carbonate, phosphoric acid and alkaline fuel cells.

An on-board reformer is also employed ahead of the fuel cell on the vehicle. The reformer extracts hydrogen from the naphtha-based fuel and the hydrogen—rich gas stream is then delivered to the fuel cell, to power it. In the fuel cell, a catalyst, preferably of platinum, separates the hydrogen into positively charged ions and electrons. When a PEM cell is used, the hydrogen ions cross a membrane in the fuel cell, mate with the oxygen from the air, and exit as water vapor. The electrons, which are repelled by the membrane, are collected to produce electric current to power an electric motor in a vehicle.

DETAILED DESCRIPTION OF THE INVENTION

It has been found that a naphtha-based fuel, in accordance with the present invention, for use in fuel cells, and on-board reformers used with fuel cells, desirably has a sulfur content of less than 1 part per million (ppm), a hydrogen content of at least 15% by weight, an aromatics content of from about 0% to about 1%, by weight, and a paraffin content of from about 30% to about 80%, by weight.

Crude naphtha comprises as much as 45% of the liquid volume of a typical barrel of crude oil. As virgin, or untreated, naphtha it contains about 0.07% sulfur, by weight, and 15 to 25%, by weight, of aromatics and 16%, by weight, of hydrogen thereby providing a fuel source which fulfills the needs and constraints of a fuel cell, provided, however, that both the sulfur and aromatics content are reduced.

In order to decrease the sulfur content and the content of the aromatics, the crude or virgin naphtha distillate is first hydrotreated in a two-stage naphtha hydrotreater (NHT) containing, for example, a cobalt/molybdenum catalyst on alumina. A whole naphtha feed is mixed with hydrogen prior to entering a 545° F. pre-heater exchanger and it is then fed to a charge heater to bring it to the required reaction temperature of from about 600° F. to about 650° F. In the reactors, desulfurization, dentrification, and olefin saturation takes place. The aromatics content is changed very little in the hydrotreating step.

After cooling and washing, the product enters the product separator where gas, liquid hydrocarbons and sour water are separated.

The liquid hydrocarbon stream then enters a naphtha stripper column (NSC) where hydrogen sulfide is withdrawn and treated with amines. LNG are condensed in a receiver and pumped to LNG treatment, and stripper bottoms, consisting of hydrotreated whole naphtha, is sent to a naphtha stripper column, where the feed is split into light hydrotreated naphtha (LHTN) and heavy hydrotreated naphtha (HHTN).

Hydrotreated light and heavy naphthas are excellent fuel candidates for fuel processors or fuel cells in view of their high hydrogen content and low sulfur and nitrogen content. However, they still contain an appreciable and unacceptable level of aromatics and this level must be reduced for their use as a feed to reformers and fuel cells by further treatment.

In order to further reduce the level of aromatics, a promoted noble metal catalyst developed by Akzo Nobel and Fina known as Ketjenfine (KF 200) aromatics saturation catalyst, was used to evaluate LHTN and HHTN in a 135 ml/hour Zeton Altamira AMI-2000 Pilot Plant. The AMI 2000 pilot plant was designed for the study of catalytic reactions utilizing both gases and liquid feeds. The system was designed to offer flexibility in its control and operation. It includes a feed delivery system, which allows precise control of up to two gases and one liquid. A condenser/separator module permits the collection of liquid products. The gas effluent is automatically routed to a gas chromatograph for analysis. The unit was operated at a WABT of 518° F. and hydrogen pressure of 1100 psi. The reactor is 0.5 meter by 1.7 cm ID, and was charged with 100 millimeters of KF-200. The catalyst was diluted 2:1 with inert silicon carbide pellets to ensure good temperature distribution. The hydrogen-oil ratio was maintained at 700:1, with a LHSV of 1.5. The average operating conditions and material balance were calculated on a daily basis. Gas samples were analyzed by gas chromatography and the molecular weight of the gas was calculated $C_5^+$ in the gas was calculated and added back to the liquid product to calculate the liquid volume yield. If the operating conditions and material balance were acceptable (between 98% and 102%), a daily composite sample was prepared. Every composite sample was analyzed for density, distillation and PIONA. The distillation results give the boiling point distribution and the PIONA analysis indicates the weight percent of paraffins, iso-paraffins, olefins, naphthenes, and aromatics and the calculated RON, C/H ratio, and average molecular weight.

Table 1 below provides a summary of operating conditions and important properties for the two hydrotreated naphtha feeds and products. The hydrogenation experiments were effective in saturating most aromatic compounds at moderately low temperature. In the case of LHTN the conversion of aromatics to naphthenes was 100% effective as indicated in Table 1. In the case of HHTN the aromatics content dropped from 16% to 1%.

TABLE 1

Conditions and Properties for Hydrogenation Analysis

|  | Light Naphtha | | Heavy Naphtha | |
| --- | --- | --- | --- | --- |
| Conditions Treatment | Hydrotreated (LHTN) | Hydrogenated (HD LHTN) | Hydrotreated (HHTN) | Hydrogenated (HD HHTN) |
| Catalyst | UOP S-12H | AKZO KF200 | UOP S-12H | AKZO KF200 |
| Temperature ° F. | 600 | 572 | 600 | 608 |
| Pressure | 300 | 1100 | 300 | 1100 |
| Hydrogen/HC | 500 | 700 | 500 | 700 |
| LHSV | 1.5 | 1.5 | 1.5 | 1.5 |
| LV % Yield | 97 | 101 | 99 | 102 |
| Properties |  |  |  |  |
| Specific Gravity | 0.659 | 0.658 | 0.737 | 0.714 |
| API Gravity @ 60° F. | 83.9 | 84.0 | 61.2 | 64.3 |
| Sulfur ppm | <1 | <1 | <1 | <1 |
| Nitrogen ppm | ND | ND | ND | ND |
| Hydrogen wt % | 16.17 | 16.41 | 14.49 | 15.31 |
| Carbon wt % | 83.83 | 83.69 | 85.51 | 84.69 |
| MW | 81.0 | 81.45 | 108.6 | 107.5 |
| RON | 61.5 | 61.2 | 54.0 | 48.8 |

TABLE 1-continued

Conditions and Properties for Hydrogenation Analysis

|  | Light Naphtha | | Heavy Naphtha | |
|---|---|---|---|---|
| Conditions Treatment | Hydrotreated (LHTN) | Hydrogenated (HD LHTN) | Hydrotreated (HHTN) | Hydrogenated (HD HHTN) |
| Heating Value (Btu/lb) | 19,500 | 19,700 | 19,900 | 20,000 |
| PIONA (wt %) | | | | |
| Paraffins | 51.9 | 51.9 | 32.7 | 32.1 |
| Isoparaffins | 39.8 | 40.7 | 32.8 | 35.8 |
| Olefins | 0.00 | 0.00 | 0.17 | 0.00 |
| Naphthenes | 6.44 | 7.39 | 18.4 | 29.9 |
| Aromatics | 1.88 | 0.00 | 15.7 | 1.09 |
| Unidentified | 0.00 | 0.00 | 0.26 | 1.31 |
| SIMDIS ° F. | | | | |
| 5% | 98 | 97.4 | 152 | 152 |
| 10% | 99 | 98.1 | 166 | 166 |
| 20% | 129 | 99.1 | 191 | 190 |
| 30% | 131 | 130.4 | 206 | 200 |
| 40% | 133 | 132 | 222 | 222 |
| 50% | 141 | 139.4 | 238 | 238 |
| 60% | 151 | 142.7 | 256 | 252 |
| 70% | 153 | 153 | 277 | 279 |
| 80% | 154 | 154.1 | 292 | 295 |
| 90% | 156 | 155.7 | 320 | 333 |
| 95% | 167 | 166.5 | 336 | 358 |
| FBP | 202 | 262.3 | 379 | 398 |

Fuel processing is a general term which has been adopted to describe the chemical engineering steps required to extract hydrogen from primary fuel sources for use in fuel cell power applications. The general stoichiometry may be expressed as follows:

$$C_mH_nO_p + (\Sigma/x\Phi)(xO_2 + (1-x)N_2) + m\sigma H_2O \ddot{o} \{CH_4, CO, H_2, CO_2, H_2O, N_2\}$$

Where: $C_mH_nO_p$ is the fuel
$\Sigma = (m+n/4-p/2)$ = stoichiometric coefficient of oxidant mixture for complete combustion
x = mole fraction of oxygen in the oxidant mixture (e.g., air)
$\Phi$ = equivalence ratio
$\sigma$ = molar steam/carbon ratio

The product set will invariably contain other species, e.g., higher alkanes, olefins, aromatics, ammonia, etc., but for any truly feasible operating conditions, the indicated products will predominate. Four special classes of fuel processing may be readily identified, depending on the utilization of air and steam, as shown in Table 2.

TABLE 2

Special Classes of Fuel Processing

| Fuel Processing Class | Oxidant/Air | Water/Steam |
|---|---|---|
| Thermal Cracking | No | No |
| Partial Oxidation | Yes | No |
| Steam Reforming | No | Yes |
| Autothermal reforming | Yes | Yes |

Autothermal reforming (ATR), was employed, which is the presently preferred technology for vehicular applications. The performance objective of the reforming step is to break the fuel down into syngas which is a mixture of $H_2$, CO, $H_2O$, and $CO_2$. The hydrogen is then extracted from the other syngas constituents in the reformer, and the carbon monoxide content is reduced to less than 10 ppm. The higher the relative concentrations of $H_2$ and CO, the higher the "quality" of the syngas. There are two primary factors which are of interest and which are related, in the present testing, namely, (1) syngas production efficiency of the reforming step, and (2) hydrogen concentration in the product gas. The syngas production efficiency ($\eta_{syn}$) is defined as the amount of hydrogen energy produced per unit of primary fuel energy consumed.

$$\eta_{syn} = (H_2 + CO\ out) \times LHV\_H_2/[(Fuel\ in) \times LHV\_Fuel)]$$

The above expression implicitly assumes the complete conversion of carbon monoxide to carbon dioxide and hydrogen—this is a valid approximation because the water gas shift stage, a downstream unit operation, is very robust for facilitating this conversion.

Figure 1:
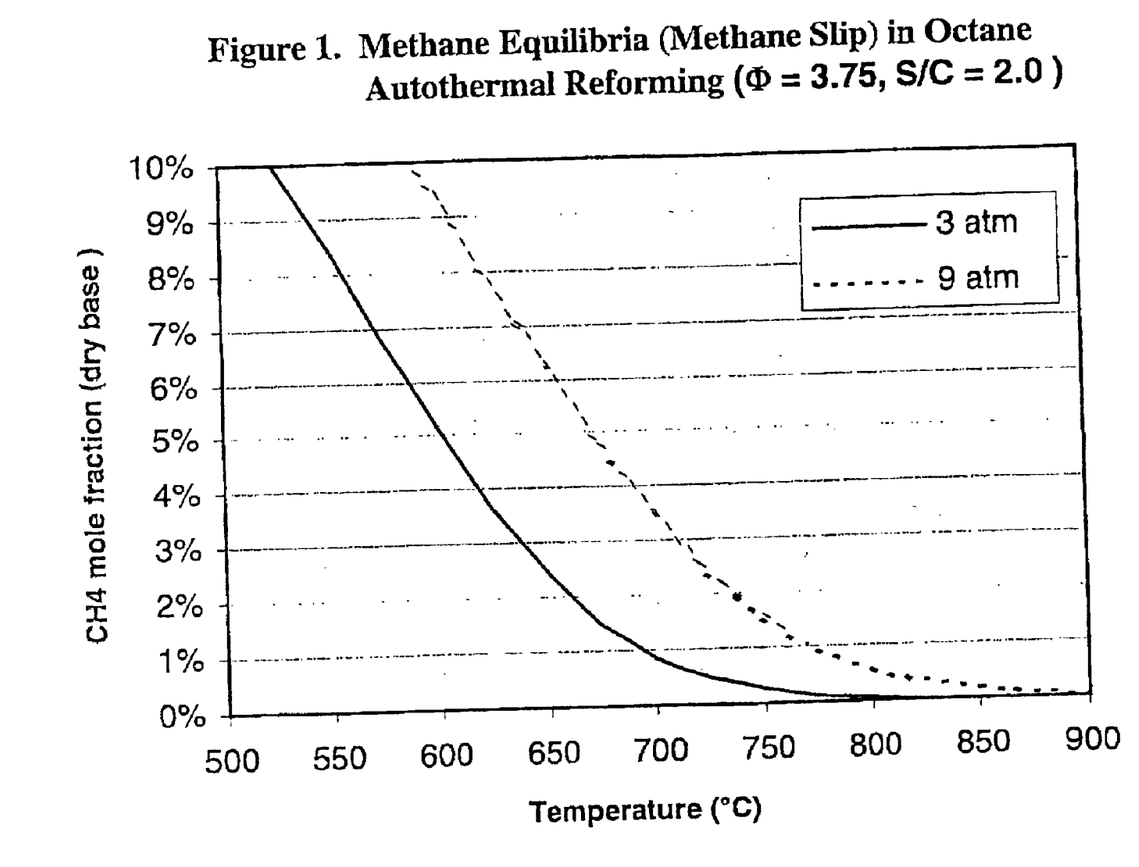
FIG. 1 is a graph depicting methane equilibria in octane autothermal reforming.

For modest pressures (e.g., <3 atm), sufficiently high temperatures (e.g. >750° C.), and typical operating parameters, the equilibrium methane concentration in the product set will be low, as shown in FIG. 1. For example, at 3 atm and 750° C., the equilibrium methane content of the product gases (at $\Phi=3.75$, $\sigma=2.0$) is about 0.2 mol % on a dry basis. As pressure is increased, the temperature must be increased to maintain the same equilibrium methane level, in accord with Le Chatelier's principle. For the purpose of developing preliminary performance expectations, methane was removed from the product set.

A stoichiometric analysis was conducted on this basis and will be discussed subsequently in the context of the results.

TABLE 3

Autothermal Reforming Test Matrix

| Test ID | Fuel | Equivalence Ratio* |
|---|---|---|
| Bench 1 | Methanol | 3.00, 3.25, 3.50, 3.75 |
| Bench 2 | Cal Phase II RFG | 3.00, 3.25, 3.50, 3.75 |
| SA 1 | Hydrogenated, Light HT Naphtha (HD LHTN) | 3.00, 3.25, 3.50, 3.75 |
| SA 2 | Reformate (sulfur-free gasoline) | 3.00, 3.25, 3.50, 3.75 |

TABLE 3-continued

Autothermal Reforming Test Matrix

| Test ID | Fuel | Equivalence Ratio* |
|---|---|---|
| SA 3 | Heavy HT Naphtha (HHTN) | 3.00, 3.25, 3.50, 3.75 |
| SA 4 | Light HT Naphtha (LHTN) | 3.00, 3.25, 3.50, 3.75 |
| SA 5 | Hydrocracker Naphtha | 3.00, 3.25, 3.50, 3.75 |

*Equivalence ratio = (Fuel/Air)/(Fuel/Air)$_{Stoichiometric}$

The fuels tested comprise a subset of the fuels discussed previously. The only experimental parameter that was adjusted was the equivalence ratio—the test matrix is shown in Table 3.

The feed preheat was kept approximately constant at 650° F. (343° C.) and the steam/carbon ratio was fixed at 2.1. The operating pressure was 3 atm. The firing rate was 80 kW$_{th}$ in all cases based on the lower heating values of the fuels. The reforming catalyst used in the tests was a base metal material on a granular alumina substrate.

All testing was done employing a Modular Pressurized Reactor (MPR) made by Nuvera Corporation of Cambridge, Mass.

The MPR is an assemblage of thoroughly instrumented, thermally controlled pipe spools, each of which houses a specific process function. Due to its disintegrated nature, different parameters can be varied independently, and their effects can be observed in isolation. The preheat, mixing, and reforming spools were used. All gas samples were collected at the exit of the reforming bed.

Multiple samples were collected at every condition to ensure repeatability. Collected samples were conditioned and sent to a specially configured gas chromatograph (GC) for analysis. The GC was calibrated in a composition range typical of the reformer section exit. All operating conditions were monitored for carbon formation using a differential pressure gauge across the reforming bed and an inline sample filter.

All fuels were tested over a range of equivalence ratios, from 3.00 to 3.75. None of the fuels exhibited carbon formation for the conditions tested. GC analyses showed repeatability to within 5% in all cases.

Because of their impact on temperature, heat losses from the system were estimated. A number of comparisons of experimentally measured steady-state temperature fields to equilibrium predictions suggest that heat losses on the fixed thermal input of 80 kW$_{th}$ were between 3 and 5 kW over the test range. In an actual integrated reactor system, they would be less.

Figure 2:
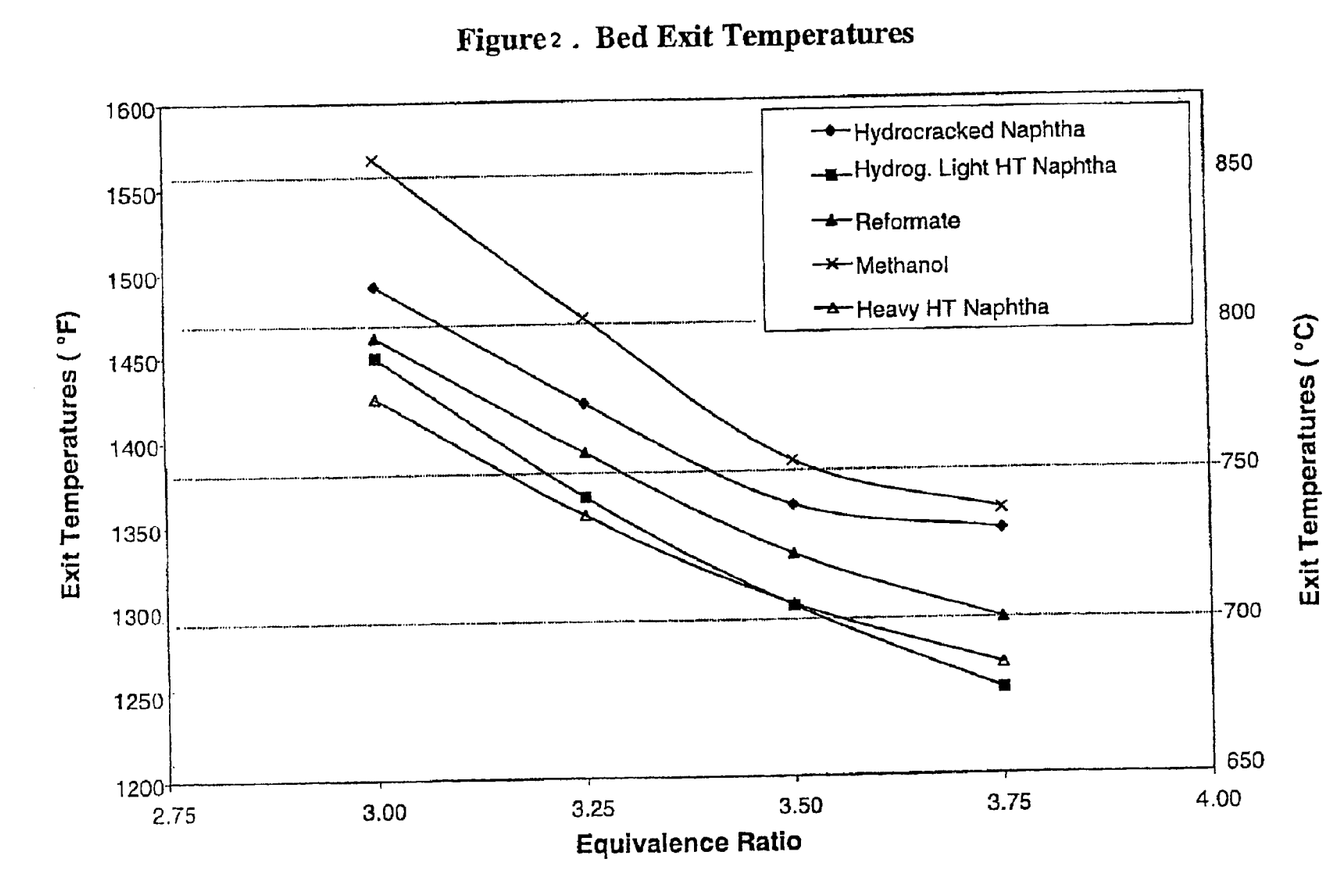
FIG. 2 is a graph depicting bed exit temperatures.

At 3 atm and above 700° C., all fuels are expected to evidence a high level of conversion of atomic carbon to CO and $CO_2$ on the basis of equilibrium, i.e., methane concentrations should be less than 1.0 mol %. For all but two of the 24 state points studied, the bed exit temperature was indeed in excess of 700° C. (1292° F.), as shown in FIG. 2. However, as can be seen in the plot of methane slip, FIG. 3, there were very clear departures from equilibrium.

Figure 3:
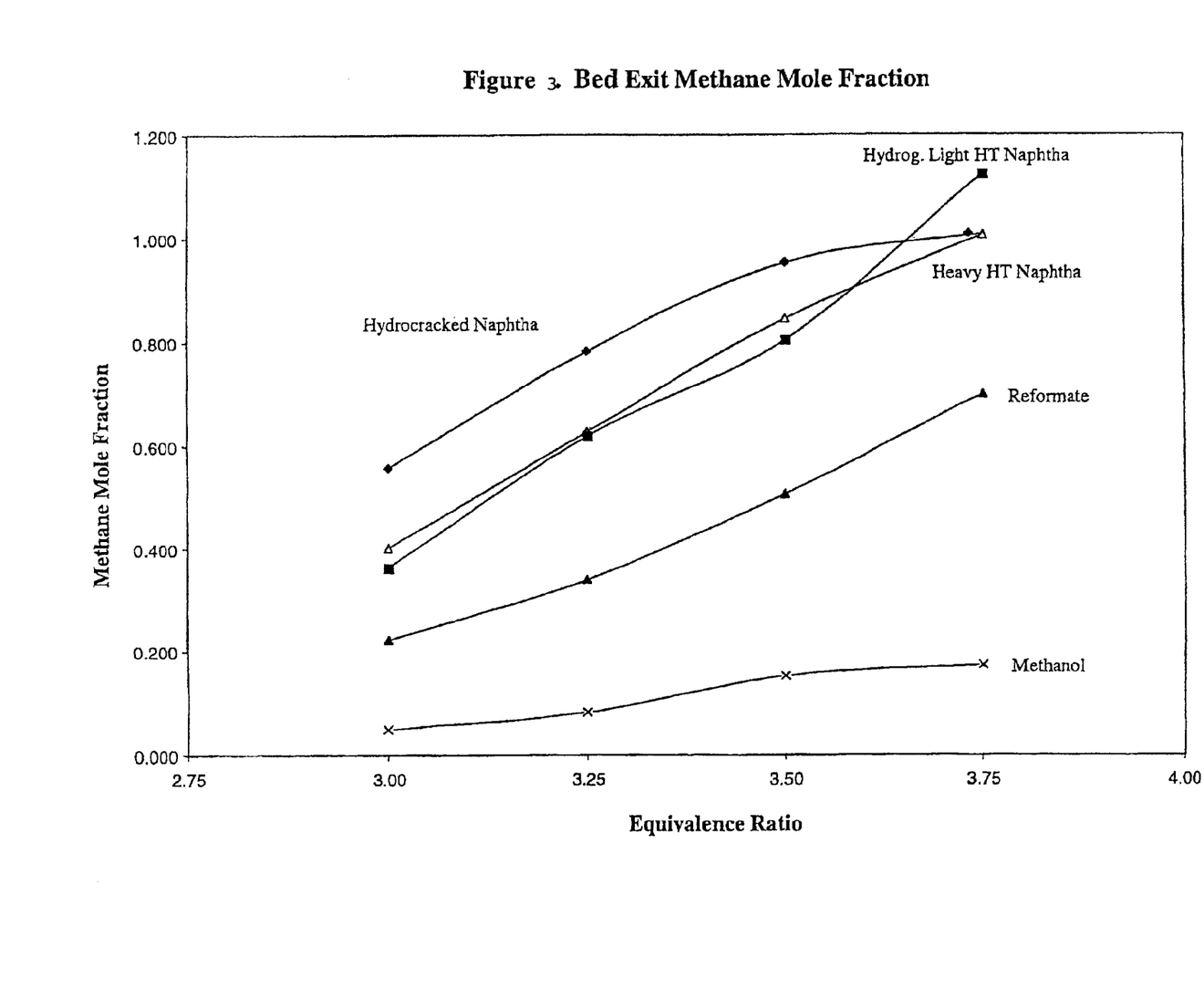
FIG. 3 is a graph depicting bed exit mole fractions.

The influence of temperature on the kinetics is apparent from FIG. 3. As the equivalents ratio is increased, compositions are changing but, more importantly, reaction temperature is falling and, accordingly, methane levels are rising because of kinetics limitations.

Methane levels are rising with equivalence ratio not because of the shift in equilibrium, but rather because of the retarded kinetics associated with reduced temperatures.

Figure 4:
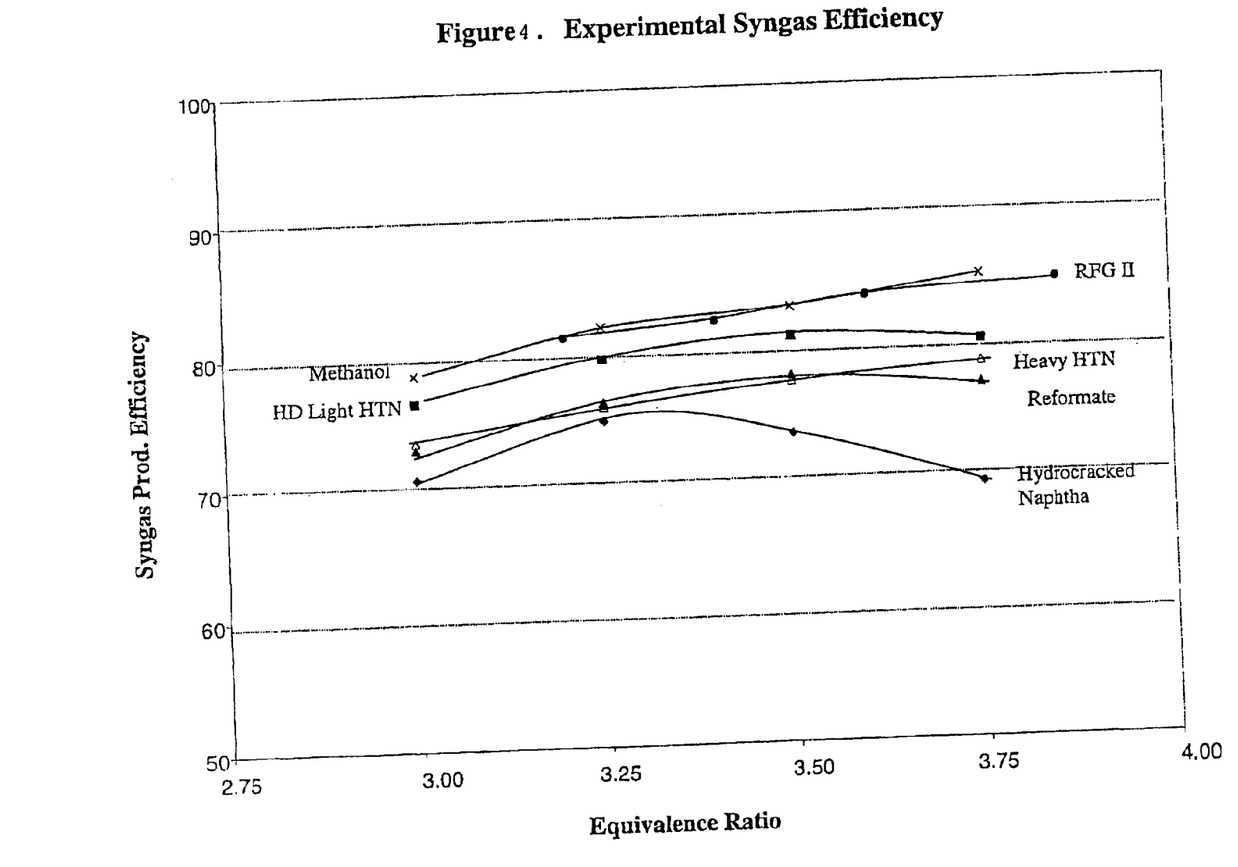
FIG. 4 is a graph depicting experimental syngas efficiency.
Figure 5:
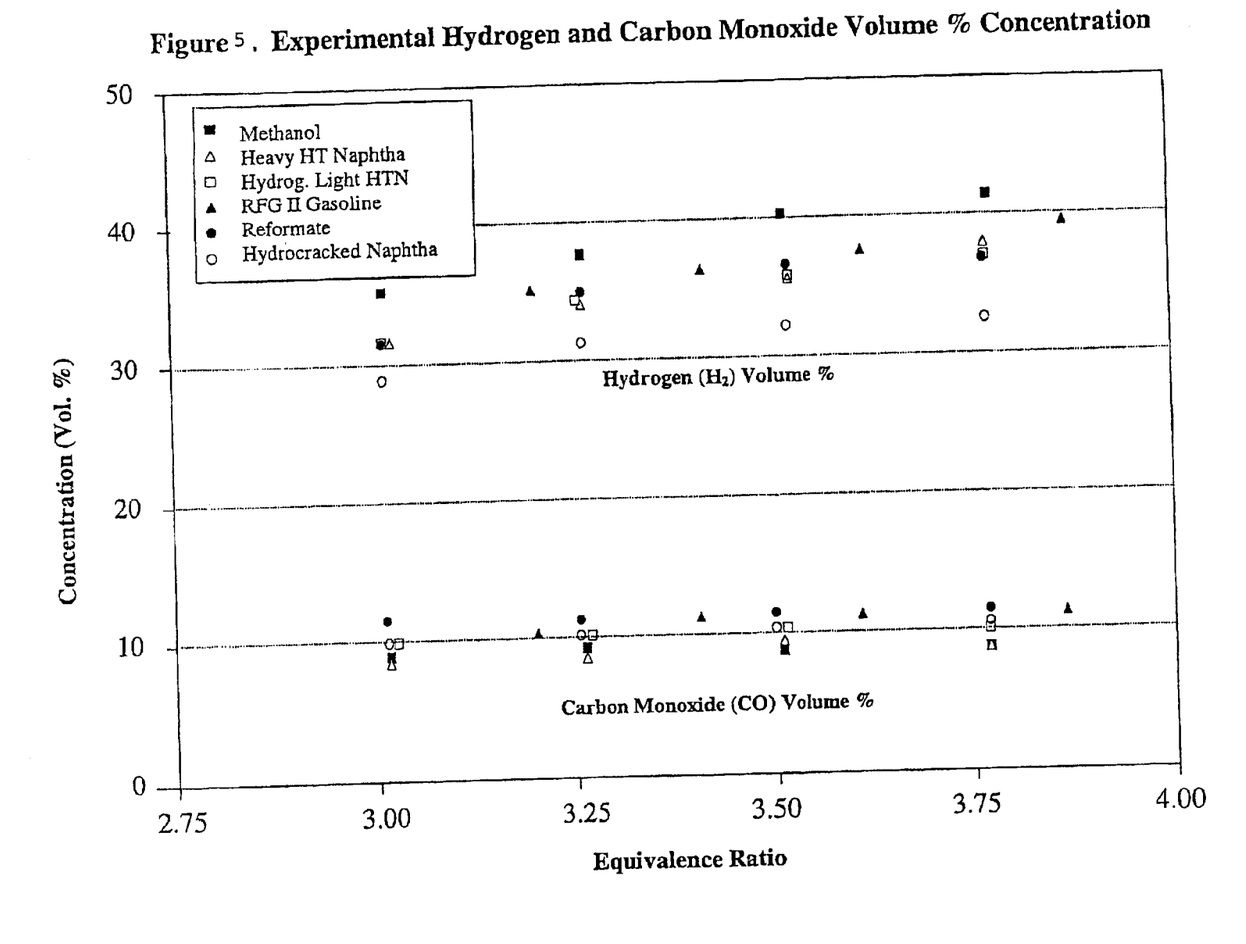
FIG. 5 is a graph depicting experimental hydrogen and carbon monoxide volume % concentration.

The methane slip has a dramatic effect on syngas production efficiency and hydrogen concentration levels as shown in FIGS. 4 and 5, because each methane molecule represents three potential hydrogen molecules, two from the atomic hydrogen, and one from the conversion of carbon as CO shift. While the data suggests methanol and gasoline have the highest syngas production efficiency, this is contrary to expectation.

An equilibrium stoichiometric analysis was done based on the properties of the different fuels. The results for predicted syngas production efficiency are plotted in FIG. 6.

Figure 6:
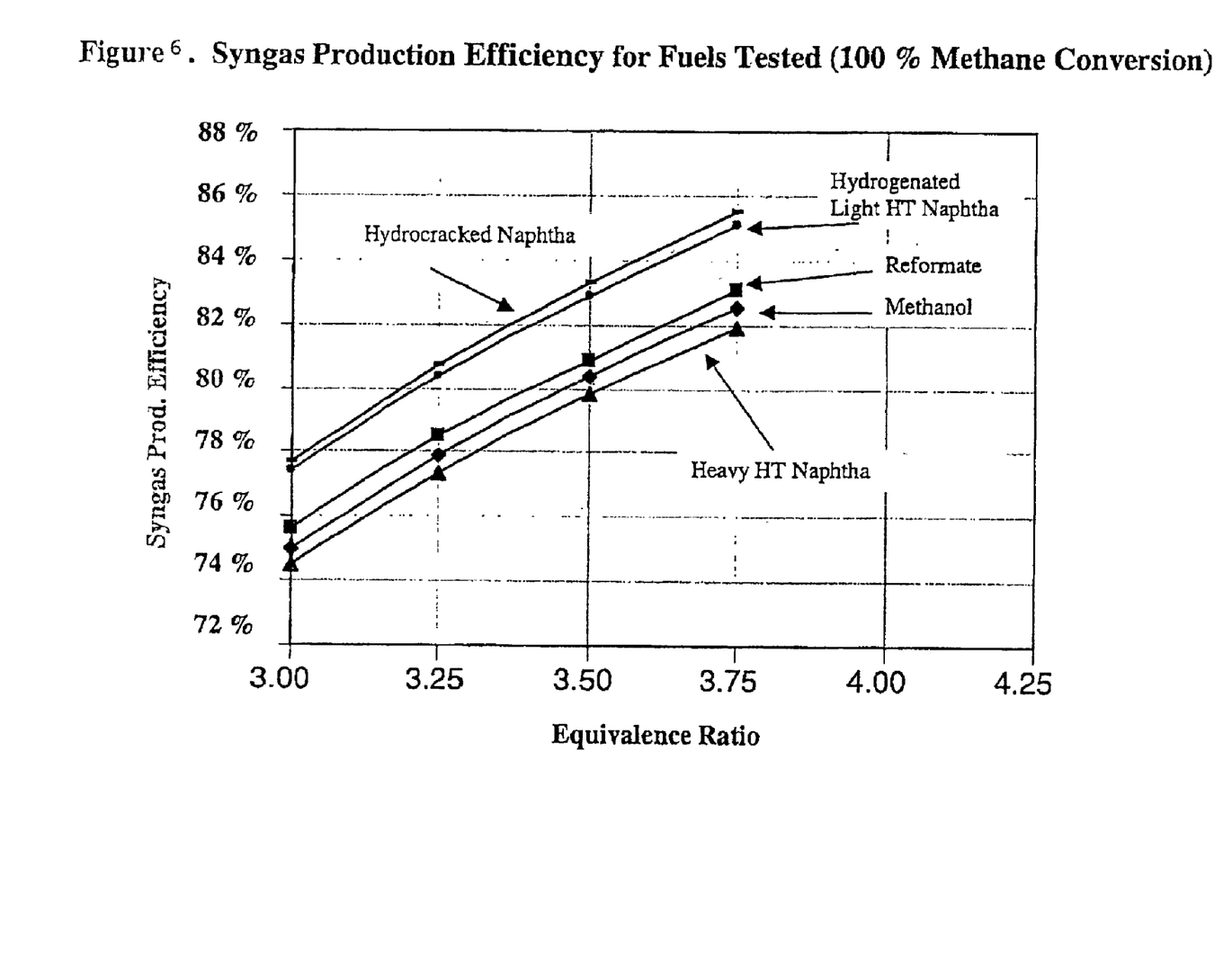
FIG. 6 is a graph depicting syngas production efficiency for fuels tested (100% methane conversion).

According to FIG. 6, hydrocracked naphtha and hydrogenated, light, hydrotreated naphtha (HD LHTN) have the highest syngas production efficiency, the complete opposite of the experimental findings. Nonetheless, it is to be noted that methanol is essentially at its theoretical limit, consistent with its low methane slip as shown in FIG. 3.

The present testing involved variation of only two parameters: fuel and equivalence ratio. For identical preheats and stoichiometries, different fuels will achieve different peak and equilibrium temperatures. These temperatures will have a very profound effect on the rate of approach to equilibrium, as is indicated clearly by the experimental data.

What is claimed is:

1. A naphtha-based light distillate fuel for use in a fuel cell reformer and a fuel cell on board a vehicle, said fuel having the following properties: a hydrogen content of at least about 15%, by weight, a sulfur content of less than about 1 ppm, an aromatics content of from about 0% to about 1%, by weight, a paraffin content of about 30% to about 80%, by weight, and a boiling range of 97.4° F. to 398° F.

2. The naphtha-based light distillate fuel according to claim 1, wherein the naphtha has been hydrotreated.

3. The naphtha-based light distillate fuel according to claim 2, wherein the hydrotreated naphtha has been hydrogenated.

4. The naphtha-based light distillate fuel according to claim 3, wherein the hydrotreating and the hydrogenation are carried out in a single stage.

5. A process for providing a hydrogen-rich fuel to a fuel cell used to provide power to a vehicle having an electric drive motor, which process comprises the steps of:
   a) feeding a naphtha-based fuel to a reformer on board said vehicle, said naphtha-based fuel having a hydrogen content of at least about 15%, by weight, a sulfur content of less than 1 ppm, an aromatics content of about 0% to about 1%, by weight, and a paraffin content of about 30% to about 80%, by weight;
   b) converting the naphtha to syngas in said reformer and recovering hydrogen from the other constituents of the syngas; and
   c) passing the hydrogen into a fuel cell on board said vehicle to produce an electric current to energize the electric motor and power the vehicle.

6. The process according to claim 5, wherein the naphtha has been hydrotreated.

7. The process according to claim 6, wherein the hydrotreated naphtha has been hydrogenated.

8. The process according to claim 7, wherein the hydrotreating and hydrogenation are carried out in a single stage.

9. The process according to claim 5, wherein the fuel cell is selected from the group consisting of solid oxide, proton exchange membrane, phosphoric acid and molten carbonate fuel cells.

10. The process according to claim 5, wherein in step b) the carbon monoxide content of the syngas is lowered to less than 10 ppm.

* * * * *